United States Patent [19]
Nemoto

[11] Patent Number: 5,002,162
[45] Date of Patent: Mar. 26, 1991

[54] BRAKE ASSEMBLY FOR VEHICLES
[75] Inventor: Shusuke Nemoto, Yao, Japan
[73] Assignee: Kanzaki Kokyukoki Mfg. Co., Ltd., Japan
[21] Appl. No.: 504,560
[22] Filed: Apr. 4, 1990
[30] Foreign Application Priority Data
  May 2, 1989 [JP] Japan .................. 1-52037[U]
[51] Int. Cl.$^5$ ............................................. B60K 17/10
[52] U.S. Cl. ........................................ 188/75; 188/74; 192/17 A
[58] Field of Search .............. 188/74, 75, 76, 29; 192/17 R, 17 A

[56] References Cited
U.S. PATENT DOCUMENTS

| | | | |
|---|---|---|---|
| 3,894,617 | 7/1975 | Wiecko et al. | 188/75 |
| 4,613,024 | 9/1986 | Irikura et al. | 192/18 |
| 4,760,685 | 8/1988 | Smith | 192/17 R |

FOREIGN PATENT DOCUMENTS

| | | | |
|---|---|---|---|
| 1161671 | 1/1967 | Fed. Rep. of Germany | 188/75 |
| 2007098 | 8/1977 | Fed. Rep. of Germany | 188/74 |
| 55-52424 | 4/1980 | Japan . | |
| 58-17220 | 2/1983 | Japan . | |
| 60-179550 | 9/1985 | Japan . | |
| 62-3306 | 1/1987 | Japan . | |

Primary Examiner—Matthew C. Graham

[57] ABSTRACT

A fluid-actuated brake assembly for braking a clutch shaft (2) of a fluid-actuated clutch (4) comprises a support plate (9) having an integral fluid cylinder mechanism for operating a pair of brake shoes (10A, 10B). The support plate includes a retaining bore (8) adatped to be fitted on a bearing (7) for receiving the clutch shaft and is secured onto a support wall (14) which holds the bearing. The brake assembly may be preassembled and, then, may be installed into a vehicle like a cassette.

1 Claim, 2 Drawing Sheets

BRAKE ASSEMBLY FOR VEHICLES

FIELD OF THE INVENTION

This invention relates to a brake assembly for use in vehicles, such as tractors, in which a fluid-actuated clutch is disposed between a drive shaft and a clutch shaft in a fashion such that a clutch housing of the clutch is fixedly mounted on the clutch shaft. More particularly, the present invention relates to a brake assembly which is associated to a fluid-actuated clutch having the structure set forth above for preventing an intertial rotation of the clutch shaft when the clutch is disengaged.

BACKGROUND OF THE INVENTION

A brake assembly of this type is generally fashioned such that it is actuated by means of either a spring or fluid pressure and is disactuated by means of either fluid pressure or a spring. In the past, a fluid cylinder mechanism for actuating or disactuating the brake has generally been provided by utilizing a wall of vehicle as shown, for example, in JP, A(U) No.55-52424, JP, A (U) No. 58-17220, JP, A(P) No. 60-179550 and JP, Y2 No. 62-3306.

The structure according to this prior art is advantageous in that a fluid cylinder formed in a vehicle wall eliminates cost for providing a separate fluid cylinder and in that space for the cylinder is saved. However, this structure does not permit a pre-assemblage of a brake assembly, having a considerable number of parts, at the outside of a vehicle. Consequently, assemblage of a brake assembly is considerably troublesome so that its manufacturing cost is heightened.

OBJECT

Accordingly, a primary object of the present invention is to provide a novel brake assembly for vehicles which may be preassembled at the outside of a vehicle and then may be installed into the vehicle in a casette-like manner while permitting a compact arrangement in a spare space within the vehicle.

BRIEF DESCRIPTION OF THE DRAWINGS

Other objects and advantages of the invention will become readily apparent as the specification is considered in conjunction with accompanying drawings, in which.

SUMMARY OF THE INVENTION

Figure 2:
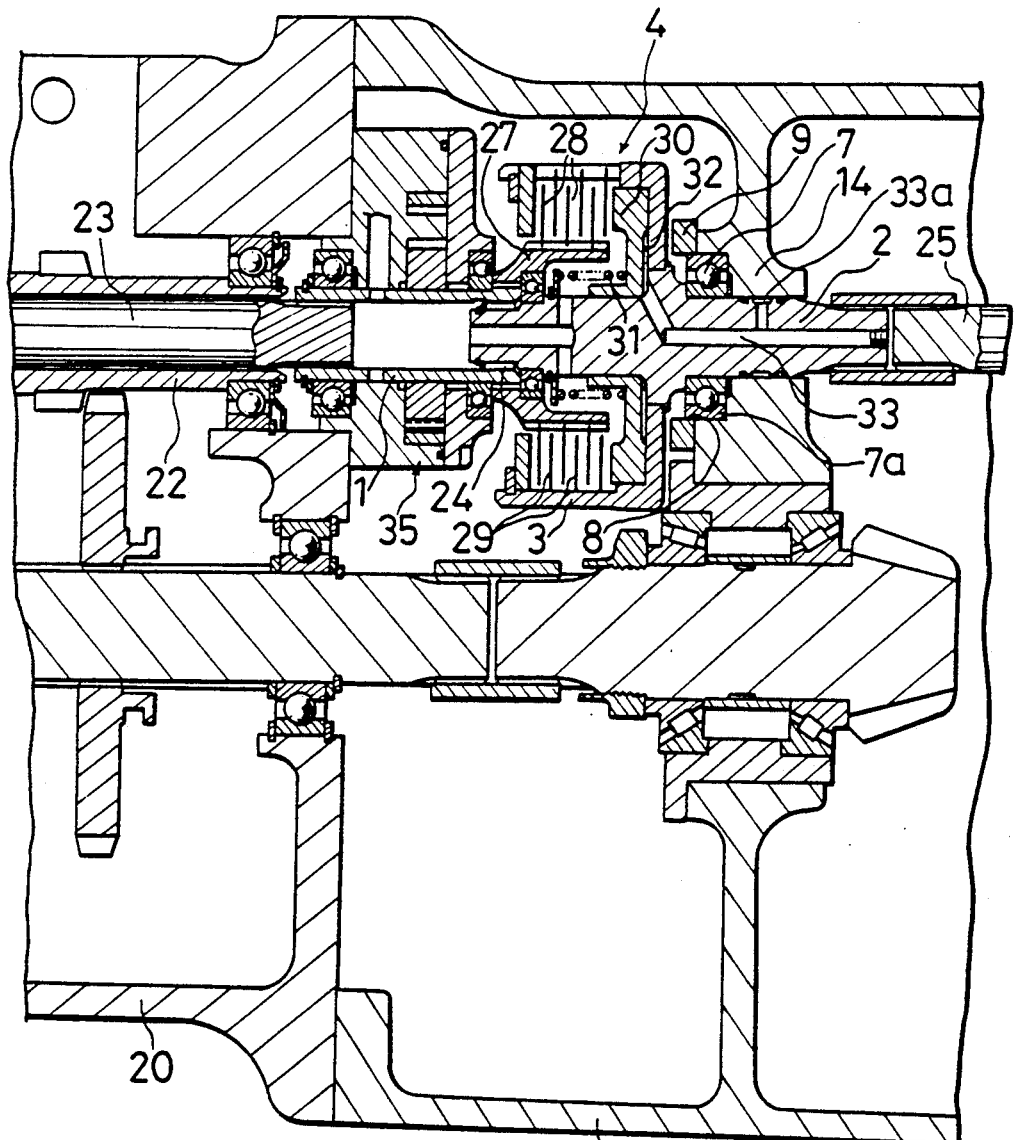
FIG. 2 is a sectional side view of a part of a tractor in which the brake assembly shown in FIG. 1 is employed.

As shown in FIG. 2, a fluid-actuated clutch 4 is disposed between a drive shaft 1 and a clutch shaft 2. The clutch has a clutch housing 3 which is fixedly mounted on the clutch shaft.

As shown in FIGS. 1 through 5, a brake assembly is provided according to the present invention which comprises a support plate 9 having a cylinder portion 6, which includes a through cylindrical bore 5, and a retaining bore 8 which is adapted to be fitted on an outer race member 7a of a ball bearing 7 for receiving the clutch shaft 2.

A pair of brake shoes 10A and 10B are disposed at positions adjacent to one and the other axial ends of the cylinder portion 6 and are supported by the support plate 9 pivotally so as to be engageable with an outer circumference of the clutch housing 3. A spring 11 is hooked at its ends to the pair of brake shoes 10A and 10B and extends along an axial direction of the cylinder portion so as to bias the pair of brake shoes to move away from the outer circumference of the clutch housing 3.

A pair of piston-piston rods 12A and 12B are slidably fitted in the cylindrical bore 5 and have inner end portions 12a and 12b which are fittingly received by each other. The pair of brake shoes 10A and 10B engage with outer ends of the pair of pistonpiston rods 12A and 12B under the biasing of the spring 11. A fluid chamber 13 which is adapted to receive brake-actuating fluid under pressure is defined in the cylindrical bore 5 between the pair of piston-piston rods 12A and 12B.

The brake assembly further comprises fastening means 15 adapted to secure the support plate 9 onto a support wall 14 in a vehicle which holds the ball bearing 7.

When fluid under pressure is supplied into the fluid chamber 13 so as to move the pair of piston-piston rods 12A and 12B away from each other, the piston-piston rods push at their outer ends the pair of brake shoes 10A and 10B to cause a frictional engagement of the brake shoes with the outer circumference of the clutch housing 3. Consequently, the clutch housing 3 and, therefore, clutch shaft 2 are braked. When fluid pressure in the fluid chamber 13 is released, the brake shoes 10A and 10B move under the biasing of spring 11 away from the outer circumference of the clutch housing 3 so that the clutch shaft 2 becomes freely rotatable.

Figure 1:
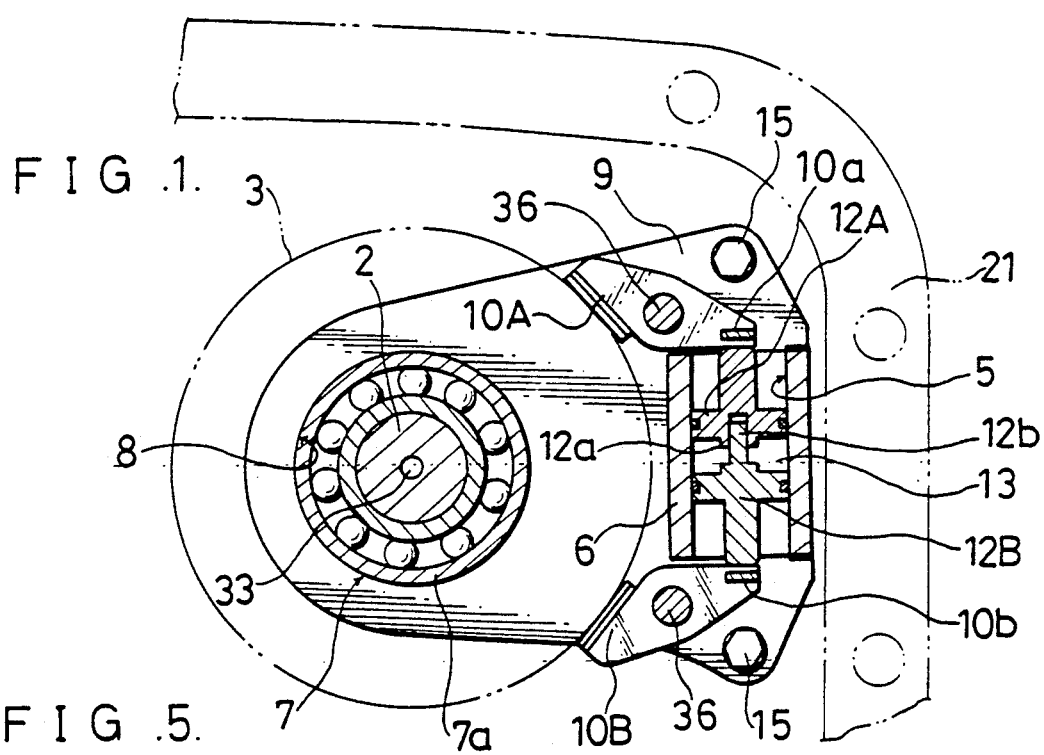
FIG. 1 is a sectional front view of an embodiment of the brake assembly according to the present invention.

Because the pair of piston-piston rods 12A and 12B are received at their inner end portions 12a, 12b by each other so as to be guided by each other, a smooth sliding movement of these piston-piston rods is attained even when thickness of a piston portion of each pistonpiston rod 12A, 12B is made small, as shown in FIG. 1, and even when a particular guide means for the piston-piston rods is not provided.

Figure 3:
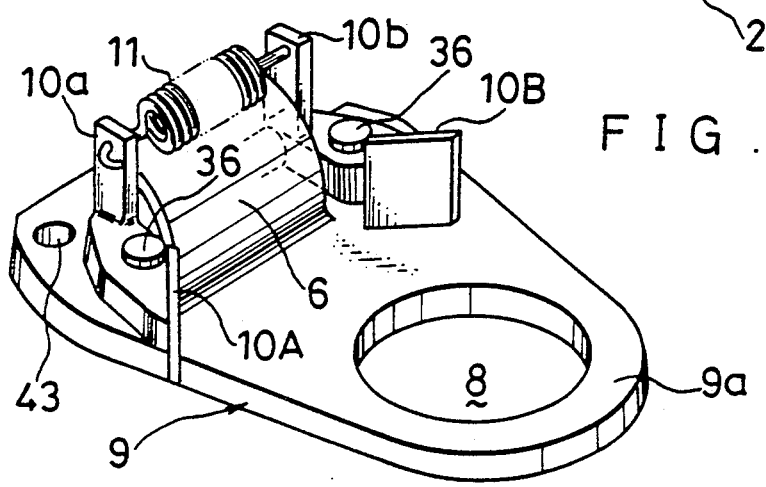
FIG. 3 is a perspective view of the brake assembly shown in FIG. 1.

The brake assembly can be pre-assembled at the outside of a vehicle into a pre-assembled structure shown in FIG. 3 by fitting the piston-piston rods 12A and 12B into the through cylindrical bore 5, by having the brake shoes 10A and 10B supported by the support plate 9, and then by stretching the spring 11 between the shoes 10A and 10B. The pre-assembly is then installed into a vehicle by fitting the retaining bore 8 on the outer race member 7a of bearing 7 and by securing the support plate 9 onto the support wall 14 using fastening means 15. It is thus seen that the brake assembly may be handled like a casette which is mounted or fitted at its retaining bore 8 on the bearing outer race member 7a. Accordingly, the brake assembly of this invention may be assembled very easily so that the cost of it is reduced.

Because the clutch housing of a fluid-actuated clutch is considerably large in diameter, there is a certain space around a ball bearing, which receives the clutch shaft 2 at the outside of the clutch housing, and between the support wall 14 and clutch housing 3. The integral cylinder portion 6 on the support plate 9 and the spring 11 extending axially of the cylinder portion are well included within such spare space in a compact fashion.

DESCRIPTION OF A PREFERRED EMBODIMENT

The brake assembly shown is employed in a tractor. FIG. 2 illustrates the inside of a rear end portion of a transmission casing 20 and a front half of a rear housing 21, which is secured to the rear of transmission casing 20, of the tractor.

A transmission shaft 23 for transmitting auxiliary implementdriving power extends through a hollow transmission shaft 22, which is incorporated in vehicle-driving power transmission path, and is connected at its rear end using a splined connection to the aforementioned drive shaft 1 which is formed into a hollow shaft. The clutch shaft 2 referred to before is supported at its front end portion by the hollow drive shaft 1 via a needle bearing 24 and at its rear end portion by the support wall 14, formed integrally with the rear housing 21, via the ball bearing 7 referred to before. The clutch shaft 2 is connected at its rear end to a transmission shaft 25 which is in turn connected via a speed-change mechanism (not shown) to a PTO (power take-off) shaft (also not shown) which extends rearwardly from the rear housing 21.

A annular rotatable support 27 is fixedly mounted on a rear end portion of the drive shaft 1 and extends rearwardly into the clutch housing 3. The fluid-actuated clutch 4 shown is fashioned to a multi-disk type having opposite sets of frictional elements 28 and 29 which are slidably but non-rotatably supported respectively by the support 27 and by the clutch housing 3. As is usual, an annular piston 30 is disposed within the clutch housing 35 and is operable to actuate the clutch when moved forwardly by fluid pressure applied to it. The clutch 4 is disengaged, when fluid pressure applied to the piston 30 is released, by the action of a return spring 31 which biases the piston to move rearwardly away from the frictional elements 28 and 29. An operating fluid passage 33 which communicates with a fluid chamber 32 behind the piston 30 is formed in the clutch shaft 2 and opens at an annular groove 33a which is formed in the outer circumference of clutch shaft 2 and is sealed by the inner peripheral wall of a shaftpassing bore in the support wall 14. The annular groove 33a provides a rotary joint between the fluid passage 33 in the rotatable shaft 2 and a stationary fluid passage (not shown) formed in the support wall 14.

A gear pump 35 for supplying fluid under pressure to the clutch 4 is provided using the drive shaft 1 as its pump shaft and is mounted on a rear surface of the rear wall of transmission casing 20.

Figure 5:
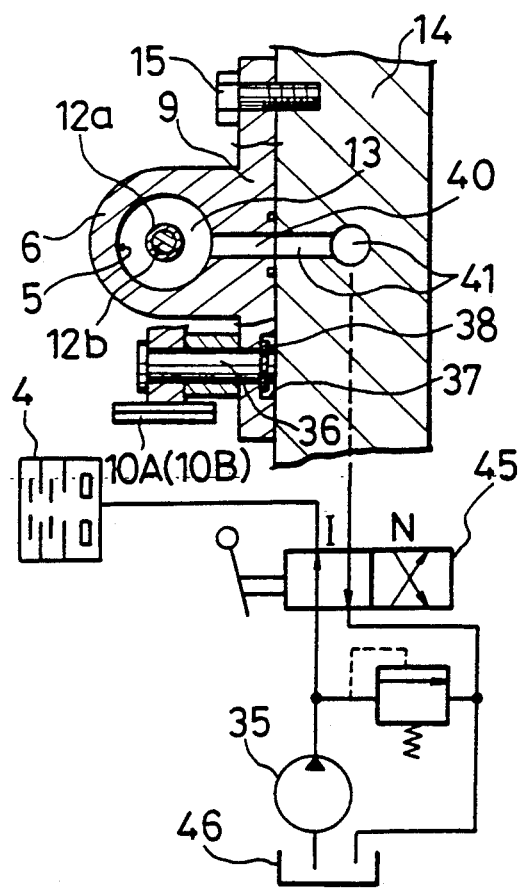
FIG. 5 is a sectional side view of the brake assembly shown in FIG. 1, showing also a fluid circuit associated to the brake assembly.
Figure 4:
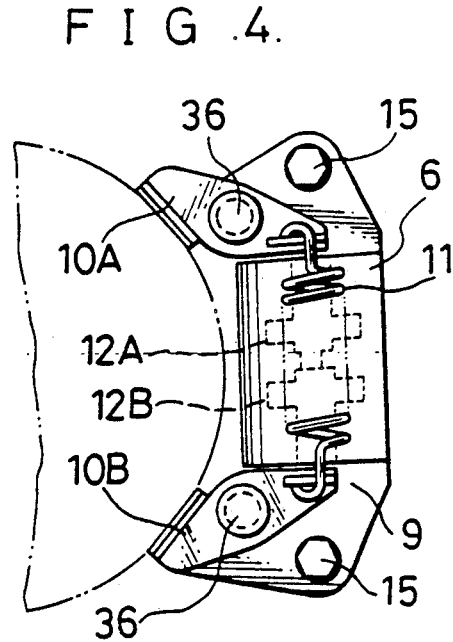
FIG. 4 is a front view of the brake assembly shown in FIG. 1.

As shown in FIG. 1 and in FIGS. 3 to 5, the pair of brake shoes 10A and 10B are adjacent to one and the other axial ends of the cylinder portion 6 and are pivotally supported by the support plate 9 using pins 36 each having a head. Each pin 36 extends, as shown in FIG. 5, into a recess 37 in the rear surface of support plate 9 and is prevented from getting-away using a snap ring 38. Each brake shoe 10A, 10B has an integral projection 10a, 10b, and the aforementioned spring 11 is hooked to the brake shoes at the projection 10a and 10b.

The pair of piston-piston rods 12A and 12B are slidably received by each other in a fashion such that a diameter-reduced inner end portion 12b of one piston-piston rod 12B is slidably fitted in a bore 12a formed in an inner end surface of the other piston-piston rod 12A. The fluid chamber 13 referred to before is formed between piston portions of the piston-piston rods 12A and 12B. A fluid passage 40 opening at the fluid chamber 13 is formed, as shown in FIG. 5, in the support plate 9 and communicates with a fluid passage 41 in the support wall 14.

As shown in FIG. 3, the retaining bore 8 referred to before is formed in the support plate 9 at a portion 9a extending away from the cylinder portion 6. At the opposite end portion, the support plate 9 includes a pair of bores 43 through which fastening means or bolts 15 shown in FIGS. 1, 4 and 5 are threadingly engaged to the support wall 14 for securing the brake assembly onto the wall 14.

As shown in FIG. 5, a control valve 45 is provided which controls supply of fluid to both of the clutch and brake. This valve 45 has an operative position I, where fluid supplied from a tank 46 by means of the pump 35 is fed to the clutch 4 while the fluid chamber 13 of the brake is connected to the tank 46, and a neutral position N where fluid from the pump 35 is fed to the fluid chamber 13 of the brake while fluid is drained from the clutch 4. It is thus seen that the brake is actuated automatically when the control valve 45 is displaced into its neutral position N so as to disengage the fluid-actuated clutch 4.

When an input shaft of an auxiliary implement such as a rotary tiller is to be connected to the aforestated PTO shaft (not shown) extending rearwardly from the rear housing 21, engine (not shown) is once stopped. As a result, the pump 35 is stopped so that the brake is disactuated by the action of spring 11. The clutch shaft 2 and shafts connected to it are now freely rotatable so that the input shaft of an auxiliary implement can be connected easily to the PTO shaft. The speed change mechanism (not shown) incorporated in the auxiliary implement-driving power transmission path at the downstream side of clutch shaft 2 is operated so as to set a selected speed ratio before a work by means of an auxiliary implement is started.

When an auxiliary implement drawn by the tractor is to be lifted to its inoperative position by means of a fluid-operated lift mechanism (not shown) or when the PTO shaft is driven to rotate with a speed proportional to that of the vehicle through a so-called ground PTO driving system (not shown), the fluid-actuated clutch 4 is disengaged by displacing the control valve 45 shown in FIG. 5 into its neutral position N. As a result, the brake shown in actuated and operates to stop an inertial rotation of the clutch shaft 2 promptly and to keep an unmoved condition of the clutch shaft with certainty.

I claim:

1. In a vehicle having a fluid-actuated clutch which is disposed between a drive shaft and a clutch shaft, a clutch housing of the clutch being fixedly mounted on the clutch shaft, a brake assembly for preventing an inertial rotation of the clutch shaft comprising:

a support plate (9) having a cylinder portion (6), which includes a through cylindrical bore (5), and a retaining bore (8) which is adapted to be fitted on an outer race member (7a) of a ball bearing (7) for receiving said clutch shaft (2);

a pair of brake shoes (10A, 10B) which are disposed at positions adjacent to one and the other axial ends of said cylinder portion (6) and are supported by said support plate (9) pivotally so as to be engageable with an outer circumference of said clutch housing (3);

a spring (11) which is hooked at its ends to said pair of brake shoes (10A, 10B) and extends along an axial direction of said cylinder portion (6) so as to bias said pair of brake shoes to move away from the outer circumference of said clutch housing (3);

a pair of piston-piston rods (12A, 12B) which are slidably fitted in said cylindrical bore (5) and have inner end portions (12a, 12b) fittingly received by each other, said pair of brake shoes (10A, 10B) engaging with outer ends of said pair of piston-piston rods under the biasing of said spring (11);

a fluid chamber (13) defined in said cylindrical bore (5) between said pair of piston-piston rods (12A, 12B) and adapted to receive brake-actuating fluid under pressure; and fastening means (15) adapted to secure said support plate (9) onto a support wall (14) in the vehicle which holds said ball bearing (7).

* * * * *